United States Patent [19]
Gucyski

[11] Patent Number: 5,146,399
[45] Date of Patent: Sep. 8, 1992

[54] SWITCHING POWER APPARATUS HAVING HIGH FACTOR AND COMPRISING PAIR OF CONVERTER FOR OBTAINING FIXED OR VARIABLE OUTPUT VOLTAGE

[76] Inventor: Jeff Gucyski, P.O. Box 11633, Costa Mesa, Calif. 92627

[21] Appl. No.: 665,950

[22] Filed: Mar. 11, 1991

Related U.S. Application Data

[62] Division of Ser. No. 393,392, Aug. 14, 1989, Pat. No. 4,999,568.

[51] Int. Cl.$^5$ .................................... H02M 3/155
[52] U.S. Cl. .......................... 363/89; 323/222; 323/224; 323/271
[58] Field of Search ............ 323/222, 224, 266, 271, 323/351; 363/89

[56] References Cited

U.S. PATENT DOCUMENTS

| | | | |
|---|---|---|---|
| 4,792,887 | 12/1988 | Bernitz et al. | 363/89 |
| 4,827,151 | 5/1989 | Okado | 307/66 |

FOREIGN PATENT DOCUMENTS

| | | | |
|---|---|---|---|
| 277367 | 12/1986 | Japan | 323/222 |
| 55069 | 3/1989 | Japan | |
| 60261 | 3/1989 | Japan | |

*Primary Examiner*—William H. Beha, Jr.

[57] ABSTRACT

The switching power supply has high output power, high efficiency and fixed or variable output voltage. The input voltage may be AC or DC. Preferably, the input current is sinusoidal. Reduced peak currents of switches result in best possible line and component utilizations at any time.

In one embodiment, a first converter has an output for converting DC input voltage into a base voltage. A first capacitor is coupled between the DC input voltage and first converter output for storing the base voltage. A second converter is coupled to the first converter output for determining the output voltage. A second capacitor filters the output voltage. Both converters are referenced to ground. A diode applies the DC input voltage to the output.

20 Claims, 3 Drawing Sheets

SWITCHING POWER APPARATUS HAVING HIGH FACTOR AND COMPRISING PAIR OF CONVERTER FOR OBTAINING FIXED OR VARIABLE OUTPUT VOLTAGE

This is as a divisional of prior application Ser. No. 393,392 filed Aug. 14, 1989, now U.S. Pat. No. 4,999,568 dated Mar. 12, 1991.

This invention is related to the following inventions by the same inventor:

"Ultra Efficient Resonant Switching Power Apparatus" Ser. No. 632,546 filed Dec. 24, 1990.

"Switching Power Apparatus with 3-State Driver" Ser. No. 517,853 filed May 2, 1990;

"Bidirectional Switching Power Apparatus with AC or DC Output" Ser. No. 518,080 filed May 2, 1990;

"Capacitive Load Driver with Binary Output" Ser. No. 474,488 filed Feb. 2, 1990;

"3-Terminal Bidirectional Switching Power Supply with AC or DC Input and AC or DC Output" Ser. No. 444,729 filed Dec. 1, 1989;

"Switching Power Supply with Constant or Sinusoidal Input Current and with Fixed or Variable Output Voltage" Ser. No. 444,730 filed Dec. 1, 1989;

"Switching Power Supply with Constant or Sinusoidal Input Current" Ser. No. 393,391 filed Aug. 14, 1989 herewith;

"Ultra Efficient Switching Power Amplifier" U.S. Pat. No. 4,980,649 dated Dec. 25, 1990;

"Synchronous Switching Power Supply Comprising Buck Converter" Ser. No. 363,325 filed Jun. 8, 1989;

"Synchronous Switching Power Supply Comprising Boost or Flyback Converter" Ser. No. 363,326 filed Jun. 8, 1989;

"Synchronous Switching Power Supply with Boost and/or Flyback Converters" Ser. No. 363,327 filed Jun. 8, 1989;

"High Power Switching Power Supply" U.S. Pat. No. 4,947,308 dated Aug. 7, 1990;

"High Efficiency Power Factor Correction Circuit" U.S. Pat. No. 4,949,234 data Aug. 14, 1990;

"High Power Switching Power Supply with High Power Factor" Ser. No. 304,508 filed Jun. 31, 1989;

"High Power Switching Power Supply Having High Power Factor" U.S. Pat. No. 4,956,760 dated Sep. 11, 1990;

"Power Switch Driver" U.S. Pat. No. 4,940,906 dated Jul. 10, 1990;

"Synchronous Switching Power Supply with Flyback Converter" U.S. Pat. No. 4,853,837 dated Aug. 1, 1989;

"High Efficiency Power Amplifier Comprising Multilevel Power Supply" U.S. Pat. No. 4,871,980 data Oct. 3, 1989;

"Switching Power Amplifier" U.S. Pat. No. 4,763,080 dated Aug. 9, 1988;

"Switching Circuits Performing Thyristor and Triac Functions" U.S. Pat. No. 4,845,391 dated Jul. 4, 1989;

"Switching Power Supply" U.S. Pat. No. 4,803,610 dated Feb. 7, 1989; and

"Switching Power Supply" U.S. Pat. No. 4,736,286. dated Apr. 5, 1988.

All inventions are by the same inventor.

BACKGROUND OF THE INVENTION

The invention relates to switching power supply (SPS) receiving AC line voltage or DC voltage, particularly for power supply systems requiring high output power, high efficiency and fixed or variable output voltage. Peak currents of switches are smallest possible as to accomplish best possible line and component utilizations. In particular, inrush and surge currents are completely eliminated.

Conventional SPSs convert AC line voltage into DC voltage. In particular, the AC voltage is rectified and further applied to an input capacitor. Charging the capacitor causes inrush current and surge currents every peak of the AC voltage. Pulse width modulation (PWM) is used which results in numerous problems including high circuit complexity, stability problems and significantly high effective switching frequency. Numerous interference suppressors and protection circuits are inevitable. Power factor correction circuits are employed which further increase complexity and decrease efficiency.

Power factor correction circuits employ a boost switching circuit. Rectified line voltage is applied thereto. Therefore, switching frequency or PWM varies in a large range. The circuit is practically inoperative near line voltage crossover. The voltage provided by the boost circuit is inherently greater than the peak of the line voltage. A troublesome mechanical switch for reducing capacitor voltages is employed. Moreover, an output capacitor is coupled to ground, whereby the inrush current is inevitable.

Power factor defines performance of an SPS. It is a ratio of the SPS output power over input power. The input power is RMS input voltage multiplied by RMS input current. The power factor is often specified only for the correction circuit. In fact, the power factor depends on efficiency of the entire SPS. A conventional power factor correction circuit simulates sinusoidal input current which is in phase with the line voltage. Therefore, the SPS simulates a resistive load. However, the power factor correction circuit must sustain peak currents at least 1.41 times higher than the RMS input current. The respective control circuit is complicated, wherein many compromises are inevitable.

SUMMARY OF THE INVENTION

One possible input current waveform is constant current. This is also the natural choice since the SPS output current remains usually unchanged during half-wave periods of the line voltage. Moreover, the SPS output voltage or voltages have fixed values. It is therefore desirable to apply a stabilized voltage to a power transformer as to minimize an output ripple current.

The present invention is intended to provide an SPS having a high output power, high efficiency and fixed or variable output voltage. The input voltage may be AC or DC. The high efficiency is achieved by activating a minimum number of switches. Peak currents of the switches are smallest possible as to accomplish best possible line and component utilizations at any time. Preferably, the input current is constant. However, the sinusoidal input current, e.g. with DC current superimposed thereon, can be also accomplished.

Considering limitations of real world, an ideal SPS should exhibit in particular:

a constant (or sinusoidal but not square-wave) input current within half-waves of line voltage, even with varying output current;

no inrush current;

no surge currents;

one bulk capacitor for storing the energy, also used during power failure;

an intermediate stabilized voltage;

universal line voltage and thus the intermediate stabilized voltage independent of peak of the line voltage;

possibility of obtaining the intermediate stabilized voltage having a high value as to reduce current ratings;

very small output ripple current as a result of the intermediate stabilized voltage;

a diode for applying rectified line voltage directly to the load as to increase the efficiency;

one pair of switches for obtaining the constant input current and intermediate stabilized voltage;

another pair of switches for accomplishing push-pull driving of power transformer and for coupling the intermediate stabilized voltage thereto;

average currents conducted by rectifiers and switches slightly higher than SPS output current divided by transformer turns ratio;

switching at zero current;

limited turn-on times of the switches;

possibility of shutting the switches off for any period of time;

possibility of switching only three switches;

at least two switches connected to ground; and no voltage spikes, no transient voltage suppressors, no snubbers, etc.

The SPS according to the present invention meets all these requirements.

Moreover, the SPS has the capability of providing a varying output voltage. Therefore, the SPS is perfectly suitable to operate with high performance switching power amplifiers as disclosed in the aforementioned "Ultra Efficient Switching Power Amplifer" U.S. Pat. No. 4,980,649 dated Dec. 25, 1990 and "Switching Power Amplifier" U.S. Pat. No. 4,763,080, dated Aug. 9, 1988, by the same inventor.

In one embodiment the SPS converts DC input voltage into output voltage, and comprises: a first converter means having an output for converting the DC input voltage into a base voltage; a first capacitive means coupled between the DC input voltage and first converter means output for storing the base voltage; a second converter means coupled to the first converter means output for determining the output voltage; and a second capacitive means for filtering the output voltage.

In another embodiment the SPS converts input voltage applied to input into output voltage, and comprises: a node; a first converter means for converting a voltage appearing between the input and node into a base voltage; a first capacitive means for storing the base voltage; a second converter means for converting the base voltage into the output voltage; a second capacitive means for storing the output voltage; a diode means for coupling the node to the first capacitive means or ground; and a switching means for selectively applying the output voltage to the node.

There are three basic configurations for converting a predetermined DC input voltage into a desired DC output voltage. Assuming positive input voltage, three components of these converters are connected to the input, ground and output, respectively:

boost converter-inductor, switch and cathode of diode;
buck converter-switch, anode of diode and inductor; and
flyback converter-switch, inductor and anode of diode.

The DC output voltages provided by the converters require a filtering due to varying output currents. In particular, the boost converter comprises the inductor and diode coupled in series between the input and output. Therefore, coupling a capacitor between the output and ground results in inrush current. According to the present invention, this problem is eliminated by coupling the capacitor between the input and output. The output voltage of the boost converter is higher than the input voltage and varies with momentary value thereof.

With reference to the boost converter, the flyback configuration is established by exchanging the switch for inductor and reversing polarity of the diode. If the input voltage is positive, the flyback converter provides a negative output voltage. With reference to the flyback converter, the buck configuration is established by exchanging the inductor for diode. Therefore, the flyback and buck converters each have switch coupled in series with the input voltage.

Power factor does not always reflect the best possible arrangement. The power factor equal 1 represents resistive load having a fixed value. However, line peak currents are $\sqrt{2}$ or 1.41 times higher than the RMS value. In contrast, a constant input current within each half-wave of the line voltage results in smallest possible peak currents and thus best possible line and component utilization. Consequently, the load represents a nonlinear resistor having sinusoidal rather than fixed resistance. Peak currents are merely $\pi\sqrt{2}/4$ or 1.11 times higher than the RMS value. Moreover, from the view point of a control circuitry, it is significantly easier to determine a fixed rather than sinusoidal input current. The impedance of the line cord and line, ESR of filter capacitors, dynamic impedance of rectifiers and impedance of EMI filter have significantly reduced effect. Phase shift and problems relating to distortions of line waveform do not exist. A new parameter, e.g. defining linearity of the constant current, should be constituted.

BRIEF DESCRIPTION OF THE DRAWINGS

The present invention will become more clear in conjunction with the accompanying figures throughout which similar references may denote similar parts and of which.

DETAILED DESCRIPTION OF THE INVENTION

Figure 1:
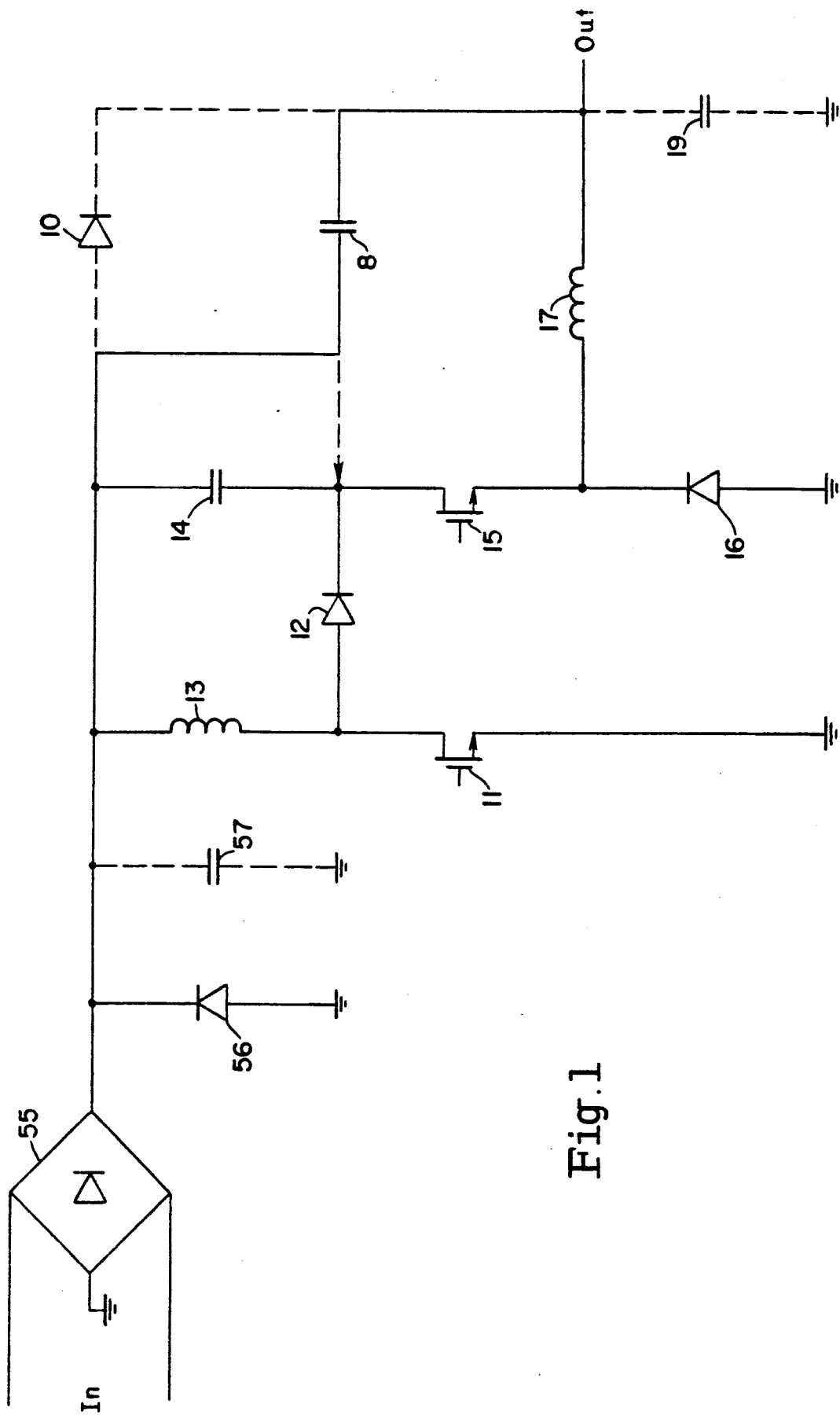
FIG. 1 is the preferred embodiment of the SPS with boost and buck converters, and with a diode coupled between rectified input voltage and output.

FIG. 1 is the preferred embodiment of the SPS with boost and buck converters, and with a diode coupled between rectified input voltage and output. The input voltage is AC, e.g. line voltage. Obviously, the SPS also employs an input line filter, not shown for simplicity. The diode bridge 55 is coupled in series with line for obtaining a positive rectified voltage, referred to as V. In particular, V is pulsating and has minimum value substantially equal zero. The SPS includes a first converter for converting V into a base voltage and a second converter coupled to first converter output for determining the SPS output voltage. Both converters are referenced to ground.

A pair of capacitive means is employed for storing voltages. Specifically, the capacitor 14 stores the base voltage which is referenced to V. The capacitor 18 filters the SPS output voltage. The capacitor 14 is coupled between V and first converter output. The second converter is coupled thereto and thus receives V increased or reduced by the base voltage. Generally, the voltage appearing at first converter output has always one polarity. Thereby, the second converter is always operable even when V is equal zero. Moreover, the SPS output can be coupled to V via the diode 10 and/or capacitor 18.

The capacitor 18 is coupled to the SPS output as to filter the SPS output voltage. The capacitor 18 is further coupled either to V or first converter output or ground. In this latter case, the capacitor 18 is equivalent to the capacitor 19 which is coupled to ground for storing the SPS output voltage. The capacitor 19 can also employed while the capacitor 18 is coupled to V or first converter output. Therefore, the capacitor 19 can be used with or substituted for the capacitor 18. The capacitor 19 acts as buffer between the SPS input and load. One of the capacitors 14, 18 or 19 has a large value as to provide the energy during power failure.

Power failure protection is accomplished by means of the diode 56 which is coupled between V and ground. The diode 56 conducts when line fails. The first converter is then inoperative. However, the second converter maintains the SPS output voltage, wherein the capacitors 14 and 18 deliver the energy. Generally, the SPS operators as if V has reached minimum value, i.e. zero, since the diode 56 conducts when V is substantially equal zero. The diode 56 may also conduct during zero crossings of the line voltage.

The optional capacitor 57 is coupled between the diode bridge 55 and ground, i.e. in parallel with the diode 56. The capacitor 57 reduces input current spikes which occur due to interrupted currents flowing to the first converter, second converter and/or SPS output. The capacitor 57 has relatively small value so that rectified line voltage is crudely filtered.

The first converter is of boost type and includes the inductor 13 coupled to V for attaining a current. The n-channel MOSFET 11 couples the inductor 13 to ground. When the transistor 11 is on and V is greater than zero, the inductor 13 is charged and diode 12 is reverse biased. When the transistor 11 is off, the diode 12 applies the inductor current to the first converter output. The capacitor 14 is coupled between V and first converter output for storing the base voltage. The base voltage is inherently limited. The transistor 11 can be turned off for a long period of time so that the series coupled inductor 13 and diode 12 act as short circuit. The base voltage is then substantially equal zero and V is applied to the second converter. Preferably, the capacitor 14 has a large value.

The second converter is of buck type and includes the inductor 17 coupled to the SPS output for attaining a current. The n-channel MOSFET 15 selectively couples the inductor 17 to the first converter output. When the transistor 15 is on, the diode 16 is reverse biased and inductor 17 is charged. The voltage across the capacitor 18 or this voltage increased by the base voltage is applied across the inductor 17 if the capacitor 18 is coupled to the first converter output or V respectively. When the transistor 15 is off, the diode 16 applies inductor current to ground. The base voltage is positive with reference to V. The base voltage is also the minimum voltage which appears at the first converter output when V is equal zero.

The second converter can be also of flyback type. With reference to buck converter, the flyback configuration is established by exchanging the diode 16 for inductor 17. In particular, both buck and flyback converters comprise the transistor 15 for selectively coupling the inductor 17 to the first converter output. The flyback converter provides the SPS output voltage which is negative with reference to ground. When the supply first turns on, the capacitor 18 is charged to the peak value of V via the diode 16, inductor 17 and possibly capacitor 14. In order to prevent the inrush current, the capacitor 18 can be eliminated and only capacitor 19 used.

The SPS output voltage may be fixed when a load is used. The second converter is always operable if the base voltage is greater than the SPS output voltage. The SPS output voltage is preferably equal to the peak value of V. If the capacitor 18 is coupled to V, the capacitor voltage varies from zero to the peak value of V. If the capacitor 18 is coupled to the first converter output, the capacitor voltage varies from the base voltage to the base voltage minus peak value of V. The transistor 15 can be turned on for a long period of time so that the series coupled inductor 17 acts as short circuit. V increased by the base voltage is then applied to SPS output.

The SPS output voltage may be also changed in a wide range independently of momentary value of V. The capacitor 18 is coupled to the load and thus conducts at least a portion of the load current. The voltage across the capacitor 18 compensates for varying value of V. If the transistor 15 is turned off, the capacitor 18 and load constitute a voltage divider. This determines the minimum value of the SPS output voltage. The transistor 15 is switched to increase the SPS input current and output voltage. The minimum voltage which appears at the first converter output is equal to the base voltage which may be also the maximum SPS output voltage. A compromise must be reached between stability of the SPS input current and SPS output voltage ripple.

The SPS input current is a sum of the currents flowing thru the inductor 13, diode 10, capacitor 14 and possibly capacitor 18. The input current intends to be equal 1.11 times the load current as to accomplish the constant input current and thus best possible performance. Moreover, the SPS input current remains constant within half-wave of the line voltage even if the load current varies in range from zero to 1.11 times the load current immediately after zero crossing of the line. The capacitor 18 filters the DC output voltage as to reduce high frequency voltage ripple. The value of the capacitor 18 also affects low frequency voltage ripple at the SPS output in a full range of load currents.

The diode 10 can be employed as to further increase efficiency of the SPS. The diode 10 conducts when V is greater than the SPS output voltage. Preferably, the SPS output voltage is set to be near the peak value of V. For instance, the diode 10 may conduct 30% or 50% of the time while V is greater than 90% or 70% of its peak value respectively. In particular, when V is near zero, the transistor 11 is inoperative and transistor 15 is switched. When V is near the peak value, the diode 10 conducts the load current and the transistor 15 can be shut off. By these means, the transistors 11 and 15 operate 30% or 50% of the time to increase the SPS input current by merely 11%. The SPS input current remains constant.

Figure 2:
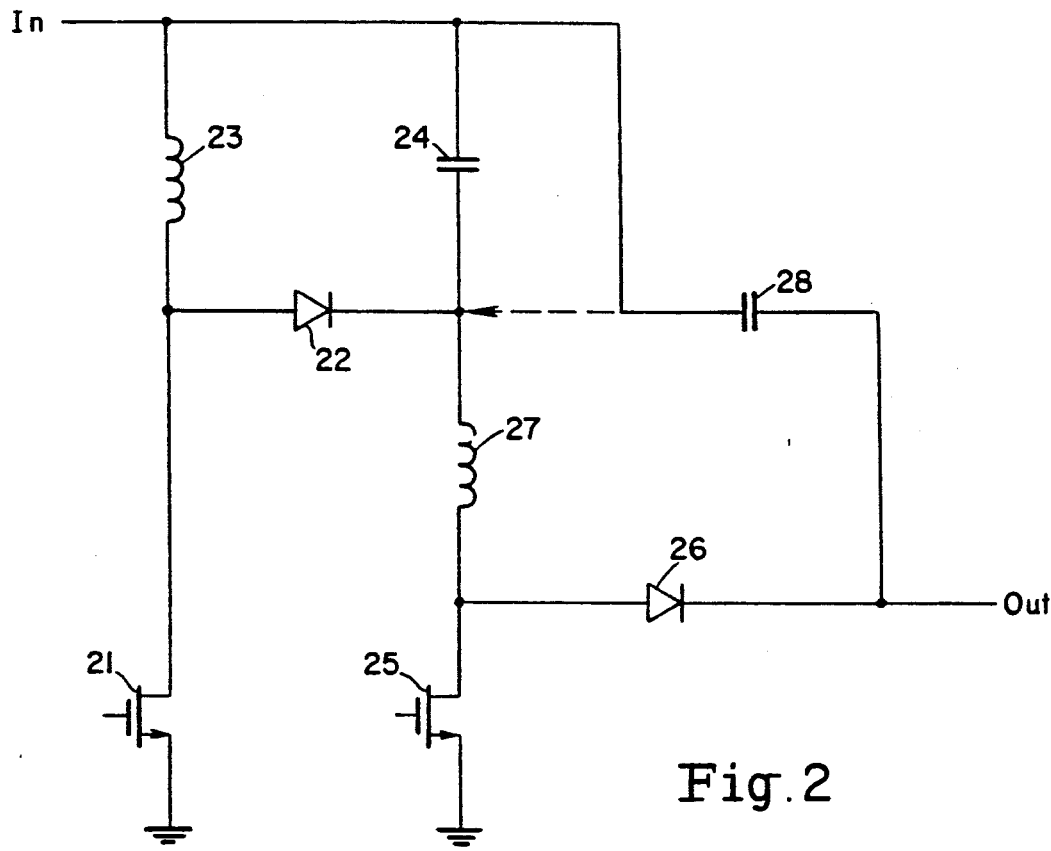
FIG. 2 is an embodiment of the SPS with a pair of boost converters.

FIG. 2 is an embodiment of the SPS with a pair of boost converters. The components 55 thru 57 of FIG. 1 can be coupled to the SPS input. In particular, V is applied thereto. A capacitor, such as 19 of FIG. 1, can be coupled to the SPS output. The SPS comprises a first converter for converting V into a base voltage, and a second converter coupled to the first converter output for determining the SPS output voltage. Both converters are referenced to ground. The first converter includes the n-channel MOSFET 21, diode 22 and the inductor 23 which are coupled and operate as the components 11 thru 13 of FIG. 1 respectively. The capacitor 24 is coupled between V and the first converter output for storing the base voltage. Preferably, the capacitor 24 has a large value.

The second converter includes the inductor 27 coupled to th e first converter output for attaining a current. The n-channel MOSFET 25 is coupled to ground for applying V increased by the base voltage to the inductor 27. When the transistor 25 is on, the inductor 27 is charged and diode 26 is reverse biased. When the transistor 25 is off, the diode 26 applies the inductor current to the capacitor 28 and SPS output. The capacitor 28 is further coupled to V or the first converter output. The base voltage is positive with reference to V. The base voltage is also the minimum voltage which appears at the first converter output when V is equal zero. Thereby, the second converter is always operable.

Figure 3:
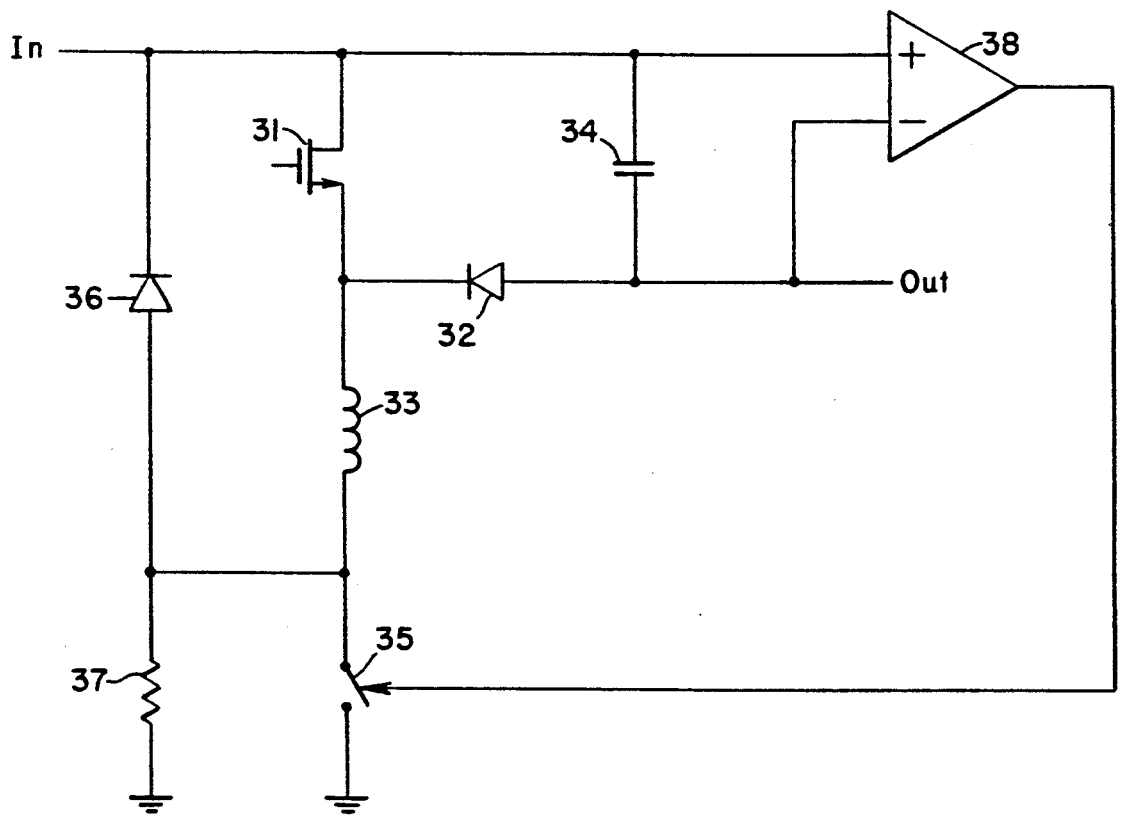
FIG. 3 is an embodiment of first or second converter coupled to respective output capacitor and utilizing switch circuit for preventing inrush current.

The capacitor 28 is coupled to the SPS output and thus conducts at least a portion of the load current. The voltage across the capacitor 28 compensates for varying value of V. The SPS output voltage may be fixed or variable. The base voltage may be lower than peak value of V as the reduce voltage ratings of the switching and capacitive components. The SPS output voltage may be equal to the peak value of V plus the base voltage. If the capacitor 28 is coupled to V, the capacitor voltage varies from the value of the base voltage to the peak value of V plus the value of the base voltage. If the capacitor 28 is coupled to the first converter output, the capacitor voltage varies from zero to the peak value of V. In particular, the transistor 25 can be shut off when V is near peak value as to increase efficiency of the SPS. The inductor 27 and diode 26 are coupled in series and act as short circuit. The SPS input current intends to be equal 1.11 times the load current as to attain the constant input current and thus best possible performance. FIG. 3 is an embodiment of first or second converter coupled to respective output capacitor and utilizing switch circuit for preventing inrush current. Accordingly, the present converter and capacitor 34 can be substituted for the first or second converter of FIG. 1 or 2 and respective capacitor, e.g. components 11 thru 14 or 15 thru 18 of FIG. 1. However, the present converter is of flyback type and the negative output voltage must be considered.

The converter includes the inductor 33 for attaining a current. The n-channel MOSFET 31 selectively couples the inductor 33 to the converter input. When the transistor 31 is on, the inductor 33 is charged and diode 32 is reverse biased. When the transistor 31 is off, the diode 32 applies the inductor current to the converter output. The capacitor 34 is coupled between the converter input and output for storing a negative voltage. Moreover, the converter output voltage is negative and load current has a reverse polarity. The boost configuration is established by reversing polarity of the diode 32 and exchanging the transistor 31 for inductor 33 and series coupled switch 35. Moreover, the capacitor 34 can be now coupled to the ground rather than the converter input, wherein the inrush current is eliminated.

The switch 35 is coupled in series with the inductor 33 for preventing an excessive current thereof. When the supply first turns on, the transistor 31 and switch 35 are open. The capacitor 34 is coupled to ground via the diode 32, inductor 33 and further resistor 37 which eliminates the inrush current. The capacitor 34 is charged to the peak value of the input voltage, e.g. V, thru the resistor 37 and possibly load. The switch 35 is closed once after any power failure and therefore a slow transistor or relay can be employed. The switch 35 shorts out the resistor 37, whereby power dissipation thereof is negligible. Moreover, the switch 35 can be switched as to charge the capacitor 34, whereby the resistor 37 is superfluous. When the switch 35 is open, the diode 36 applies the current of the inductor 33 to the converter input, wherein the capacitor 34 is charged.

The comparator 38 monitors the voltage across the capacitor 34 and has an input offset voltage determined by peak value of the input voltage. The switch 35 is closed if the capacitor voltage is near the peak value. The switch 31 is switched as to further charge the capacitor 34, whereby the converter output voltage is negative. The switch 35 can be open at any time, e.g. when a voltage spike is applied to the converter input.

Figure 4:
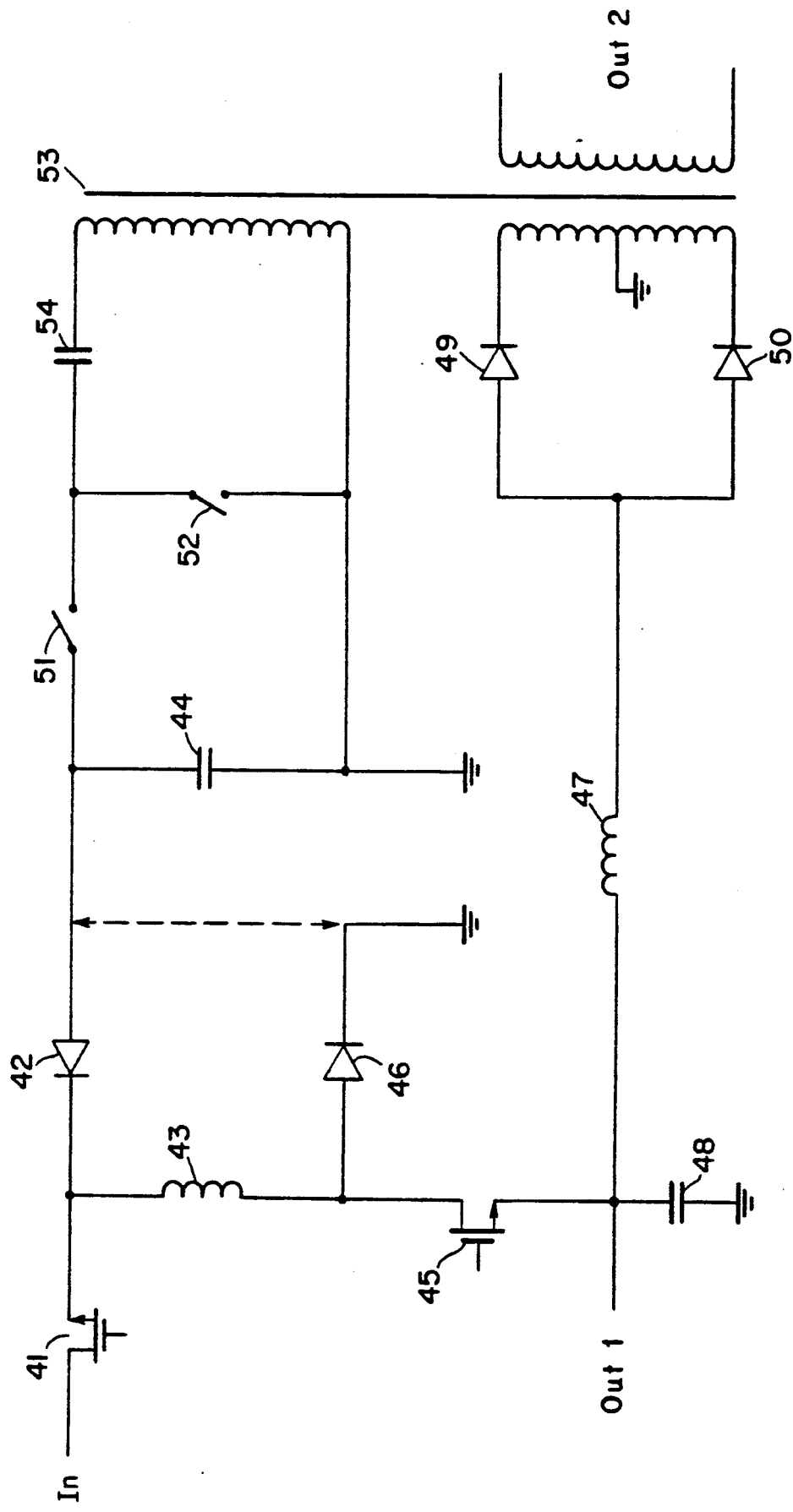
FIG. 4 is an embodiment of the SPS with second converter providing AC and DC output voltages.

FIG. 4 is an embodiment of the SPS with second converter providing AC and DC output voltages. The components 55 thru 57 of FIG. 1 can be coupled to the SPS input. In particular, V is applied thereto. The SPS includes a first converter for converting a voltage appearing between the SPS input and a node into a base voltage. The capacitor 44 stores the base voltage. A second converter converts the base voltage into the DC and AC output voltages appearing at the outputs Out1 and Out2 respectively. The capacitor 48 is coupled between Out1 and ground for storing the DC output voltage. The diode 46 couples the node to the capacitor 44 or ground. The n-channel MOSFET 45 selectively applies the DC output voltage to the node.

The first converter may be of flyback type as shown. The flyback converter comprises the inductor 43 coupled to the node for attaining a current. The n-channel MOSFET 41 selectively couples the inductor 43 to V. The base and DC output voltages are negative. When V is above a threshold, the transistor 41 is switched and transistor 45 is open. When the transistor 41 is closed, V is applied across the inductor 43. The diode 42 is reverse biased and diode 46 applies the inductor current to ground. When V is below the threshold, the transistors 41 and 45 are switched. When the transistors 41 and 45 are closed, the diodes 42, 46 are reverse biased and V increased by the voltage stored in the capacitor 48, i.e. DC output voltage, is applied across the inductor 43. Subsequently, the transistors 41 and 45 are turned off. The current of the inductor 43 flows thru the diodes 42 and 46 as to charge the capacitor 44.

The second converter is coupled across the capacitor 44 for converting the base voltage stored therein into the AC and DC output voltages. The second converter includes an inductive means for providing the AC output voltage. Specifically, the transformer 53 has a pair of secondary windings, one coupled to the diodes 49, 50 and having center tap, and the other coupled to Out2. The capacitor 54 is coupled in series with primary of the transformer 53 for storing a voltage. A switching means comprises the switches 51 and 52 for selectively coupling the capacitor 54 to the base voltage. Each switch can consist of a transistor and diode coupled in parallel therewith to prevent any voltage spikes and reverse currents in the transistor.

The second converter is a modified half bridge circuit. The ordinary half bridge circuit can be obtained by replacing the capacitor 44 with a pair of series coupled capacitors, and coupling the primary thereto rather than ground. The capacitor 54 is then optional. The present configuration comprises the capacitor 54 which stores a voltage equal half the base voltage. The primary is coupled in series with the capacitor 54 and further across the switch 52. The switches 51 and 52 are coupled in series across the capacitor 44. The capacitor 48 and second converter, which comprises the components 47 and 49 thru 54, can be also employed as load with the FIG. 1 and 2 embodiments.

When the switch 51 is on, the switch 52 is off and the base voltage reduced by the voltage stored in the capacitor 54 is applied across the primary of the transformer 53. Subsequently, the switches 51 and 52 are turned off and on respectively. The voltage stored in the capacitor 54 is applied across primary. Therefore, the switches 51 and 52 are switched so that voltages having substantially equal magnitudes and opposite polarities are successively applied across primary of the transformer 53. Moreover, the capacitor 54 prevents DC current in the primary, whereby flux symmetry problems are corrected inherently.

The switches 51 and 52 can be turned on for a fixed period and remain off for any period of time. These periods are preferably equal while the SPS provides a maximum output current, i.e. under full load condition. A minimum switching frequency is limited by determining a maximum pulse width. A control circuit can employ comparators as to avoid an analog feedback. The current flowing thru the primary can be also monitored by means of comparators as to determine short circuit current of the SPS. Another comparator can be employed to compare an average input current of the SPS against a fixed reference voltage.

The transformer 53 has a pair of secondary windings. One winding is coupled to the cathodes of the diodes 49, 50 and has center tap which is coupled to ground. The other winding is coupled to Out2. The diodes 49 and 50 rectify the respective AC output voltage. The inductor 47 is coupled between Out1 and anodes of the diodes 49, 50 for limiting currents flowing therethrough and reducing an output ripple voltage. The capacitor 48 is coupled between Out1 and ground for storing the DC output voltage.

The base or DC output voltage can be stabilized. In either case, the output ripple current flowing thru the inductor 47 is minimized. Out1 may be used as the only output of the SPS. However, if the value of the DC output voltage is inadequate, higher stability or line isolation is desired, Out2 may be used. The respective secondary winding may have a center tap. The components such as 47 and 50 can be coupled to the winding for providing a second DC output voltage. The base voltage may be reduced when V is below the threshold, i.e. when the transistor 45 is switched, as to prevent charging of the capacitor 48 while using energy stored therein. An excessive value of the DC output voltage is prevented by increasing the threshold voltage. If variable SPS output voltage is desired, the value of the capacitor 44 is relatively small.

The first converter may be of any type. With reference to the flyback converter, which is shown, the boost configuration is established by exchanging the transistor 41 for inductor 43 and reversing polarity of the diode 42. In particular, the transistor 41 is then coupled to the node. The inrush current can be eliminated by using the same principle as in the FIG. 3 embodiment. In particular, a switch corresponding to 35 of FIG. 3 can be coupled in series with the inductor 43. The capacitor 44 can be also coupled to the SPS input rather than ground if the first converter is of flyback or boost type. The second converter is always coupled across the capacitor 44.

The first converter may be also of buck type. With reference to the flyback converter, which is shown, the buck configuration is established by exchanging the diode 42 for inductor 43. Furthermore, the diode 42 is coupled to ground and the inductor 43, transistor 45 and diode 46 remain coupled to the node. The dashed line in FIG. 4 depicts this modification. In particular, the transistor 41 applies V to the inductor 43 which is further coupled to the capacitor 44 via the diode 46. In any case, the first converter converts a voltage appearing between the SPS input and node. Accordingly, the voltage is equal V decreased by the base voltage or V increased by DC output voltage, when the transistor 41 is closed, and transistor 45 is open and closed respectively.

The present invention represents a significant advance in the field of SPSs. In particular, FIGS. 1, 2 and 4 show SPSs capable of obtaining constant input current and fixed or variable output voltage. Line voltage is universal and inrush current is eliminated. Smallest possible peak currents result in best possible line and component utilizations at any time.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power supply converting pulsating DC input voltage applied to an input into output voltage, comprising:
    a first converter means having a first output for converting the DC input voltage into a base voltage;
    a first capacitive means coupled between the input and first output for storing the base voltage;
    a second converter means having a second output for converting a voltage appearing at the first output into the output voltage appearing at the second output; and
    a second capacitive means coupled between the first output and second output for filtering the output voltage.

2. Switching power supply of claim 1 wherein the first converter means includes:
    an inductive means for attaining a current;
    a switching means for selectively coupling the inductive means between the input and ground; and
    a rectifying means for applying the current to the first output means.

3. Switching power supply of claim 1 wherein the second converter means includes:

an inductive means for attaining a current;

a switching means for selectively coupling the inductive means to the first output; and a rectifying means for applying the current to ground.

4. Switching power supply of claim 1 wherein the second converter means includes:

an inductive means for attaining a current;

a switching means for selectively coupling the inductive means between the first output and ground; and a rectifying means for applying the current to the second output.

5. Switching power supply of claim 1 wherein at least one converter means includes an inductive means for attaining a current, and further including a switching means coupled in series with the inductive means for preventing an excessive value of the current.

6. Switching power supply of claim 1 further including an input capacitive means coupled to the input for reducing input current spikes.

7. Switching power supply of claim 1 further including a rectifying means for rectifying an AC input voltage and providing the DC input voltage.

8. Switching power supply of claim 1 further including a rectifying means coupled to the input for conducting a current when the DC input voltage is substantially equal zero.

9. Switching power supply of claim 1 further including a rectifying means coupled between the input and second output for applying the DC input voltage to the output voltage.

10. Switching power supply of claim 1 wherein the second capacitive means includes a capacitor coupled to ground.

11. Switching power supply converting pulsating DC input voltage applied to an input into output voltage, comprising:

a first converter means having a first output for converting the DC input voltage into a base voltage;

a first capacitive means coupled between the input and first output for storing the base voltage;

a second converter means having a second output for converting a voltage appearing at the first output into the output voltage appearing at the second output; and a second capacitive means coupled between the second output and ground for filtering the output voltage.

12. Switching power supply of claim 11 wherein the first converter means includes:

an inductive means for attaining a current;

a switching means for selectively coupling the inductive means between the input and ground; and a rectifying means for applying the current to the first output.

13. Switching power supply of claim 11 wherein the second converter means includes:

an inductive means for attaining a current;

a switching means for selectively coupling the inductive means to the first output; and a rectifying means for applying the current to ground.

14. Switching power supply of claim 11 wherein the second converter means includes:

an inductive means for attaining a current;

a switching means for selectively coupling the inductive means between the first output and ground; and a rectifying means for applying the current to the second output.

15. Switching power supply of claim 11 wherein at least one converter means includes an inductive means for attaining a current, and further including a switching means coupled in series with the inductive means for preventing an excessive value of the current.

16. Switching power supply of 11 further including an input capacitive means coupled to the input for reducing input current spikes.

17. Switching power supply of claim 11 further including a rectifying means for rectifying an AC input voltage and providing the DC input voltage.

18. Switching power supply of claim 11 further including a rectifying means coupled to the input for conducting a current when the DC input voltage is substantially equal zero.

19. Switching power supply of claim 11 further including a rectifying means coupled between the input and second output for applying the DC input voltage to the output voltage.

20. Switching power supply of claim 11 wherein the second capacitive means includes a capacitor coupled to the first output.

* * * * *